United States Patent
Vazquez Garcia et al.

(10) Patent No.: US 11,035,706 B2
(45) Date of Patent: Jun. 15, 2021

(54) FLOW MEASURING SYSTEM HAVING SEPARATELY ROTATABLE FLUID MEASURING PLATFORM AND FLUID APPLYING PLATFORM

(71) Applicant: ACTEGA ARTISTICA, S.A.U., O Porrino (ES)

(72) Inventors: Ismael Vazquez Garcia, Porto do Son (ES); Carlos Perez Betanzos, Tomino (ES); Jose Trigo Collazo, Vigo (ES); Ricardo Lourido Santoro, Soutomaior (ES)

(73) Assignee: ACTEGA ARTISTICA, S.A.U., O Porrino (ES)

( * ) Notice: Subject to any disclaimer, the term of this patent is extended or adjusted under 35 U.S.C. 154(b) by 0 days.

(21) Appl. No.: 16/954,067

(22) PCT Filed: Nov. 29, 2018

(86) PCT No.: PCT/EP2018/082937
§ 371 (c)(1),
(2) Date: Jun. 15, 2020

(87) PCT Pub. No.: WO2019/120919
PCT Pub. Date: Jun. 27, 2019

(65) Prior Publication Data
US 2020/0378810 A1    Dec. 3, 2020

(30) Foreign Application Priority Data

Dec. 18, 2017  (EP) ..................................... 17382859

(51) Int. Cl.
*B05C 5/02* (2006.01)
*G01F 1/58* (2006.01)

(52) U.S. Cl.
CPC .............. *G01F 1/58* (2013.01); *B05C 5/0225* (2013.01)

(58) Field of Classification Search
None
See application file for complete search history.

(56) References Cited

U.S. PATENT DOCUMENTS

| 5,499,745 A | 3/1996 | Derian et al. |
| 6,010,740 A | 1/2000 | Rutledge et al. |
| 2020/0217780 A1* | 7/2020 | Su .......................... G01N 11/00 |

OTHER PUBLICATIONS

International Search Report and Written Opinion for Corresponding International Application No. PCT/EP2018/082937 (12 Pages) ( dated Mar. 13, 2019).
International Preliminary Report on Patentability for Corresponding International Application No. PCT/EP2018/082937 (18 Pages) (dated Dec. 10, 2019).

* cited by examiner

*Primary Examiner* — Harshad R Patel
(74) *Attorney, Agent, or Firm* — Lucas & Mercanti, LLP

(57) ABSTRACT

The present invention refers to a flow measuring system and, more particularly, to a flow measuring system adapted for measuring a flow rate of sealant applied to a plurality of parts, the flow measuring system having a plurality of flowmeters, each of the flowmeters in fluid communication with a fluid injector, and the plurality of flowmeters being configured to generate, process and transmit a signal related to the flow rate of the injected fluid.

15 Claims, 5 Drawing Sheets

FLOW MEASURING SYSTEM HAVING SEPARATELY ROTATABLE FLUID MEASURING PLATFORM AND FLUID APPLYING PLATFORM

CROSS REFERENCE TO RELATED APPLICATION

This Application is a 371 of PCT/EP2018/082937 filed on Nov. 29, 2018 which, in turn, claimed the priority of European Patent Application No. 17382859.1 filed on Dec. 18, 2017, both applications are incorporated herein by reference.

TECHNICAL FIELD OF THE INVENTION

The present invention belongs to the field of flow measuring systems and, more particularly, to the field of flow measuring systems for a fluid applying system.

BACKGROUND OF THE INVENTION

Currently, the majority of fluid injection processes rely on manual operation for the monitoring and control of the amount of fluid applied to a part. The monitoring and control process, comprising measurement, registration and adjustment of the amount of applied fluid, requires the physical presence of an operator in each stage. This monitoring and control process is manual, time consuming and sporadic, which leads to a poor overall process performance. A typical compound dry film weight monitoring process is performed as follows:
1. weighting a set of raw parts in a laboratory scale,
2. marking the parts for identification,
3. feeding the machine with the parts,
4. identifying and recovering the parts at the machine outfeed,
5. heating the parts in a furnace to remove the volatile elements,
6. weighting the parts in a laboratory scale,
7. computing the weight difference and contrasting it with a reference value.

This process could take more than twenty minutes, and is typically performed every four hours. In the current state of the art, the applying process is left unmonitored for up to four hours, meaning that in a typical fluid applying system with an output of two thousand parts per minute, around half a million parts are produced without any control. Besides, the weight value obtained using this manual operation does not meet the desired accuracy. This procedure is also highly dependent on the skills and training of the operator, and creates variability in the process which is not admissible in a highly competitive industry. In order to overcome the problems derived from the aforementioned manual operation, it is possible to use flow measuring systems in the fluid supply of the fluid applying system, such as flowmeters, so that the flow rate is continuously monitored. However, known flowmeters are usually bulky, heavy and expensive, and show inaccuracies which make them unable to be used in these applications.

Furthermore, a significant number of fluid applying systems are rotatory systems, which rotate at high speeds while injecting a fluid. These rotational devices are subjected to very high inertial stresses, thus hampering the use of the above mentioned flowmeters in rotatory systems. The lack of room in rotatory systems is also a problem for the use of these flowmeters.

Efforts have been made to provide a solution to these problems, although they have not been successful in improving the overall performance of the production process. The fact that the industry still performs manual weight control by part confirms that the known solutions do not solve these problems.

As of the current state of the art, it is not possible to monitor automatically the amount of fluid dispensed by each individual injector in high-speed rotatory fluid applying systems.

SUMMARY OF THE INVENTION

The present invention provides an alternative, reliable and efficient solution for the aforementioned problems, by a system for measuring a flow, a method for measuring a flow and a system for controlling the application of a fluid to a plurality of parts. Preferred embodiments of the invention are also defined.

In a first inventive aspect, the invention provides a flow measuring system for a fluid applying system to a plurality of parts, the flow measuring system adapted for measuring a flow rate of a fluid applied to each one of the plurality of parts, the fluid applying system comprising,
  a plurality of supporting means configured for supporting the plurality of parts,
  a plurality of fluid injectors arranged in a fluid applying platform, the plurality of fluid injectors adapted to inject a fluid,
  wherein the flow measuring system comprises,
  a plurality of flowmeters, each of the flowmeters in fluid communication with one of the fluid injectors, the plurality of flowmeters being configured to generate, process and transmit a signal related to the flow rate of the injected fluid,
  at least a first signal processing device, adapted to process the flow rate signals of the plurality of flowmeters, and
  a fluid measuring platform, adapted to hold at least the plurality of flowmeters,
  and wherein the fluid applying system is configured to generate one or more signals related to the application of a fluid to a part, and is operatively connected to the first signal processing device.

Throughout this entire document, part will be understood as an object of any kind which is subjected to a fluid application process, for instance a can lid.

The term fluid should be understood as a substance with an essentially fluid behavior, comprising liquids and paste-like substances, as well as mixtures comprising solids or gases, for example a sealant compound; compound, sealant, sealing compound or sealant compound must be considered equivalent terms.

It will be understood that fluid applying system is a device or system whose aim is to deliver or apply a fluid to or on a part.

The term fluid injector should be understood as the element of the fluid applying system capable of releasing a fluid at will.

In this document, the term signal processing device will be understood as any device capable of receiving an input signal, processing said signal and emitting or transmitting an output signal, like for example a programmable logic computer (PLC) or a radiofrequency emitter-receiver.

Throughout this document, flowmeter will be understood as a device capable of sensing a flow rate of a fluid and to generate a signal of any kind related to the flow rate of the injected fluid. In one possible embodiment, the flowmeters comprise a sensing device, which carries out the measurement, and a processing element, which generates the related signal and emits said related signal.

Advantageously, the flow measuring system can be used with a fluid applying system in a fluid applying process where the accuracy of the flowmeters is critical, and the physical characteristics of the flowmeters make them unable to be furnished in existing fluid applying systems. To that end, a fluid measuring platform is provided, where the flowmeters can be installed, along with its auxiliary elements without hindering the normal operation of the fluid applying system, and without major modifications. Although it is possible to use a single flowmeter common to all the injectors, for instance at the beginning of the fluid supply line, the flow rate varies on each injector, and therefore they must be adjusted manually every time; the present invention however, proposes the use of a high precision flowmeter for each injector, which provides separate flow rate values for each injector. Advantageously, the signals related to the application of a fluid to a part allow the signal processing device to count the number of processed parts, as a variable to compute the amount of applied sealant.

In a particular embodiment, the fluid applying system is a rotatory fluid applying system, and the fluid measuring platform is configured to rotate in conjunction with the fluid applying platform of the rotatory fluid applying system.

Advantageously, the rotatory fluid applying system comprises a plurality of fluid injectors arranged in a substantially radial symmetry on a fluid applying platform which rotates around an axis, and the fluid measuring platform holding the plurality of flowmeters rotating around the same axis in conjunction with the fluid applying system. As a further advantage, the arrangement of the plurality of flowmeters does not increase the inertial stresses of the fluid applying platform and at the same time, the plurality of flowmeters remains in fluid communication with the plurality of fluid injectors.

In a particular embodiment, the fluid applying system comprises one or more position sensors in at least one of the supporting means configured for generating a signal related to the application of a fluid to a part, and the first signal processing device is operatively connected to the one or more position sensors and configured to count the number of processed parts with the signal related to the application of a fluid to a part.

Advantageously, the position sensors enable the signal processing device to determine the presence of a part in a fluid application position, which in normal operation denotes the application of fluid to a part, and therefore allows the signal processing device to count the number of processed parts, as a variable to compute the amount of applied sealant.

In a particular embodiment, the signal related to the application of a fluid to a part is an opening signal of an injector, or a closing signal of an injector, or both.

In a particular embodiment, the flow measuring system further comprises at least a second signal processing device adapted to process the flow rate signal of each flowmeter or the signal related to the application of a fluid to a part, or both, and operatively connected to the first signal processing device Advantageously, the second signal processing device allows to reduce the number of operations performed by the first signal communication device, and to place the first signal communication device on a distant position with respect to the fluid applying system, thus reducing the number of elements physically arranged inside of the fluid measuring platform.

In a particular embodiment, the fluid measuring platform is adapted to hold the first signal processing device, or the second signal processing device, or both.

Advantageously, the first and/or second signal communication devices are arranged on or in the fluid measuring platform, substantially near the plurality of flowmeters, so that the first and/or second signal communication devices can receive the flow rate signal.

In a particular embodiment, the flowmeters of the plurality of flowmeters are high precision flowmeters, preferably electromagnetic flowmeters.

Advantageously, an electromagnetic flowmeter provides the required degree of accuracy and lightness to be installed in the fluid measuring platform within a very limited volume. As a further advantage, electromagnetic flowmeters do not need a calibration prior to its use, and a change in the type of fluid does not require any additional preparation before initializing the injection process.

In a particular embodiment, the plurality of flowmeters is arranged substantially on the outside of the fluid measuring platform.

Advantageously, the external arrangement of the plurality of flowmeters enables an easy access to the flowmeters and its elements, for maintenance purposes.

In a particular embodiment, the plurality of flowmeters is arranged substantially on the inside of the fluid measuring platform.

Advantageously, the internal arrangement of the plurality of flowmeters reduces even more the inertial stresses and enables a compact design.

In a particular embodiment, the fluid measuring platform comprises a plurality of openings configured to enable an operative connection between each of the flowmeters and the at least first processing device, or to enable a fluid communication between the plurality of flowmeters and the plurality of fluid injectors, or both.

Advantageously, the openings enable the access of a number of elements to the interior, for instance, a wired communication between a processing device and a flowmeter, when the plurality of flowmeters are arranged externally, or a fluid communication between the fluid supply conduits and the plurality of flowmeters in fluid communication with the injectors, when the plurality of flowmeters are arranged internally.

In a particular embodiment, the fluid measuring platform comprises a substantially symmetric shape.

Advantageously, a fluid measuring platform with a substantially radial symmetry enables an even distribution of masses.

In a particular embodiment, the second signal processing device comprises at least a signal communication device, operatively connected to the plurality of flowmeters, and operatively connected to the first signal processing device.

Advantageously, the communication device enables a wireless signal communication between the signal processing devices, or between a signal processing device and a flowmeter, or both. As a further advantage, the signal communication device enables signal amplification, if the signal is too weak to be processed directly.

In a second inventive aspect, the invention provides a method for measuring a flow in a fluid applying system for applying a fluid to a plurality of parts, the fluid applying system comprising a flow measuring system according to any of the previous embodiments, wherein the method comprises the following steps:
a. inputting initial data in the first signal processing device,
b. initiating the fluid injection,
c. measuring the amount of fluid injected with a flowmeter,
d. transmitting a signal related to the flow rate to the first signal processing device,
e. generating and emitting a signal related to the application of a fluid to a part to the first signal processing device,
f. determining the amount of fluid injected with the signals related to the flow rate and the initial data,
g. outputting the result of the computed amount of fluid injected to a displaying means and storing the result.

Advantageously, the method enables the measurement and registration of the flow in a fluid applying system with a flow measuring system as described in the previous inventive aspect, without performing a purely manual process and providing a sufficient degree of accuracy.

In a particular embodiment, the method further comprises between steps e. and f. the step of transmitting, a signal related to the flow rate or a signal related to the application of a fluid to a part or both from the second signal processing device to the first signal processing device.

Advantageously, if the flow measuring system comprises a second signal processing device, one or more signals are amplified and transmitted from the second signal processing device to the first signal processing device, allowing the use of the invention on environments subject to severe interference.

In a particular embodiment, one or more signals, like a signal related to the flow rate or a signal related to the application of a fluid to a part, or both are collected and grouped in order to be transmitted. Advantageously, this way of processing the signals simplifies the communication between the signal processing devices and enables the fluid measuring system to manage a larger number of flowmeters.

In a particular embodiment, an amount of fluid injected is expressed in terms of weight of dry fluid per part.

Advantageously, the value of amount of fluid in terms of dry fluid or dry film weight reflects the amount of compound which remains in the part, without the presence of volatile elements.

In a third inventive aspect, the invention provides a system for controlling the application of a fluid to a plurality of parts comprising a flow measuring system according to any of the previously discussed inventive aspects.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Figure 1:
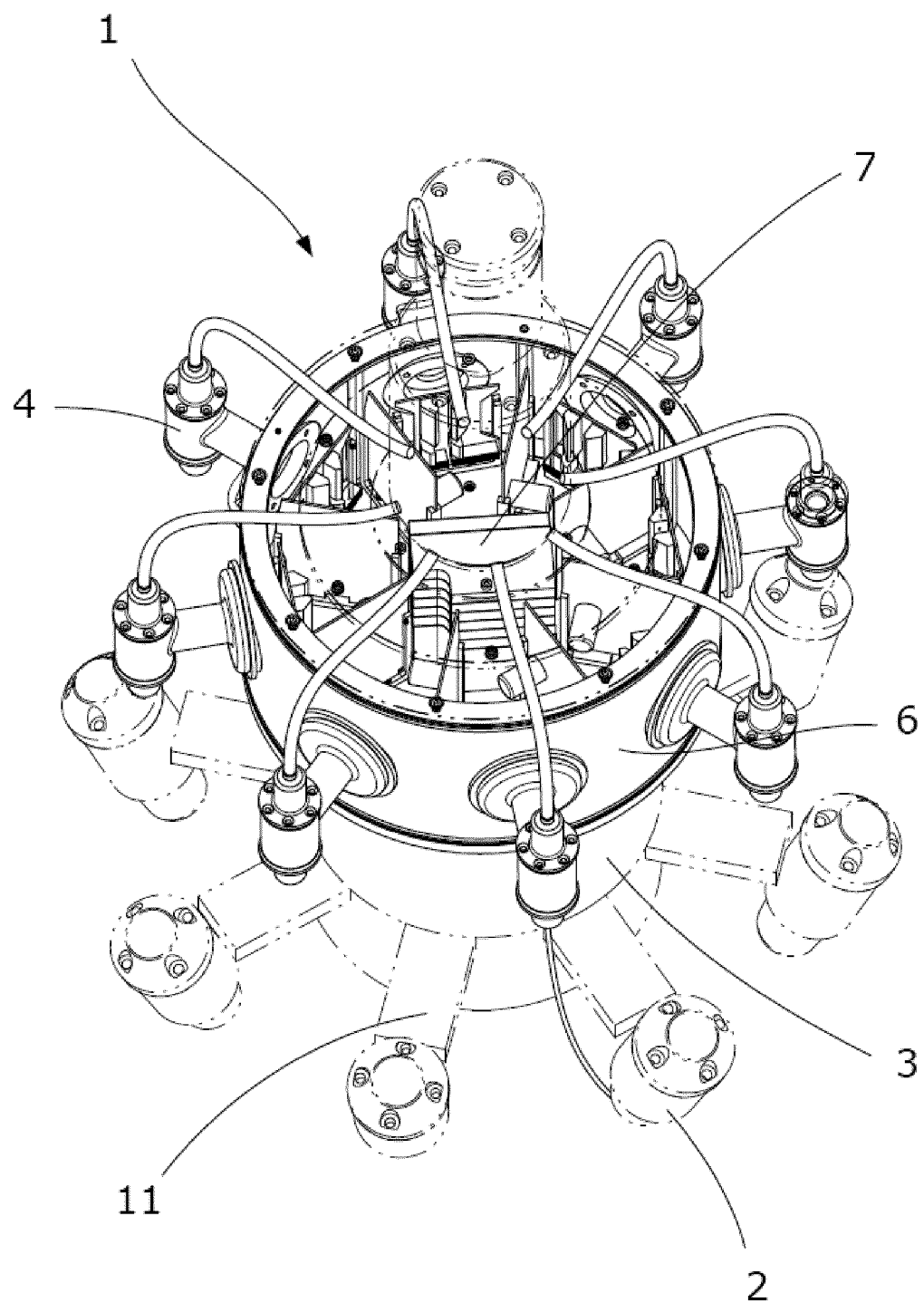
FIG. 1 This figure shows a perspective view of an embodiment of the flow measuring system.

The present invention is intended to automatically monitor the amount of sealing compound applied to a part (9), i.e. measuring and registering the dry film weight of applied sealant. In an embodiment, the present invention is used in combination with a high speed rotary sealant applying system comprising a plurality of needle injectors (2) mounted in a rotatory fluid applying platform (3). To meet the requirements of accuracy and high speed of injection, electromagnetic flowmeters (4) are used.

The present invention can be used on new fluid applying systems, or can be retrofitted on existing equipment by means of simple modifications.

Fluid Applying System

The fluid applying system is a high speed rotary fluid applying system, e.g. a rotary sealant injection machine; it receives individual parts (9) and applies a precise amount of sealant on each of them with the fluid injectors (2). In this type of rotary sealant injection machine, the sealant fluid is continuously fed to the rotating injectors (2) by means of corresponding pipes in fluid communication with a fluid feeding pot (12), which is essentially a pressurized rotary tank intended for containing the fluid to be applied by the injectors (2). In some cases, a rotary fluid application machine applies a dry weight of sealant as low as around 14 mg per part (9) within a very narrow range of around ±3 mg, at a rate of around 2 000 parts (9) per minute.

The high speed rotary sealant injection machine of the embodiment depicted with dotted line on FIGS. 1, 2 and 4a-4c comprises eight supporting means (10), eight fluid injectors (2), attached to a fluid applying platform (3) which rotate beneath the central rotary fluid feeding pot (12), shown in FIGS. 2 and 4a-4c, above, with dotted line, around a vertical axis. Both the supporting means (10) and the fluid injectors (2) are distributed following a substantially radial symmetry, for example spaced around 45° from the adjacent elements.

The fluid applying platform (3) of the depicted embodiment is cylindrical in shape, comprises a plurality of arms (11) for holding the fluid injectors (2), and rotates around the vertical axis.

The high speed rotary sealant injection machine has one or more position sensors (8) for each supporting means (10) that indicates that the part (9) is in the application position, and gives the order to the injector (2) to inject the product. In practice, this signal works as an indicator of the application of a fluid to a part (9) and is used by the first signal processing device (7) to count the number of parts (9) that are applied by injector (2). In another embodiment, the signal related to the application of a fluid to a part (9) is generated by a fluid applying system control processor, using an injector (2) opening and/or closing signal. This injector (2) opening and/or closing signal gives the order to each injector to begin and/or to stop the application of fluid to the part (9). This sensor can also measure the application time. A part (9) counter can perform the task of generating a count signal as well.

Flow Measuring System

The flow measuring system (1) monitors the flow rate of sealant dispensed by each individual injector (2) with a high precision flowmeter (4) in fluid communication with a corresponding fluid injector (2). In order to meet the accuracy requirements, the flowmeters (4) need enough precision to detect less than a milligram applied in a few milliseconds. Furthermore the flowmeters (4) need to work in different temperature conditions rotating at high speed. The only type of flowmeters (4) capable of meeting these requirements are the electromagnetic flowmeters (4), based on electromagnetic induction.

One of the main drawbacks of the electromagnetic flowmeters (4) is that they generate a weak signal, which should be amplified or otherwise processed prior to its emission or use. Therefore, these flowmeters (4) usually comprise an electronic element, with an associated power source and other elements, which make electromagnetic flowmeters (4) bulky and heavy. In order to avoid the problems generated by these flowmeters (4), namely the inertial stresses and the lack of space, the present invention proposes the addition of a rotatory fluid measuring platform (6), adapted to hold the flowmeters (4) and associated elements, and operate in high speed conditions.

Figure 2:
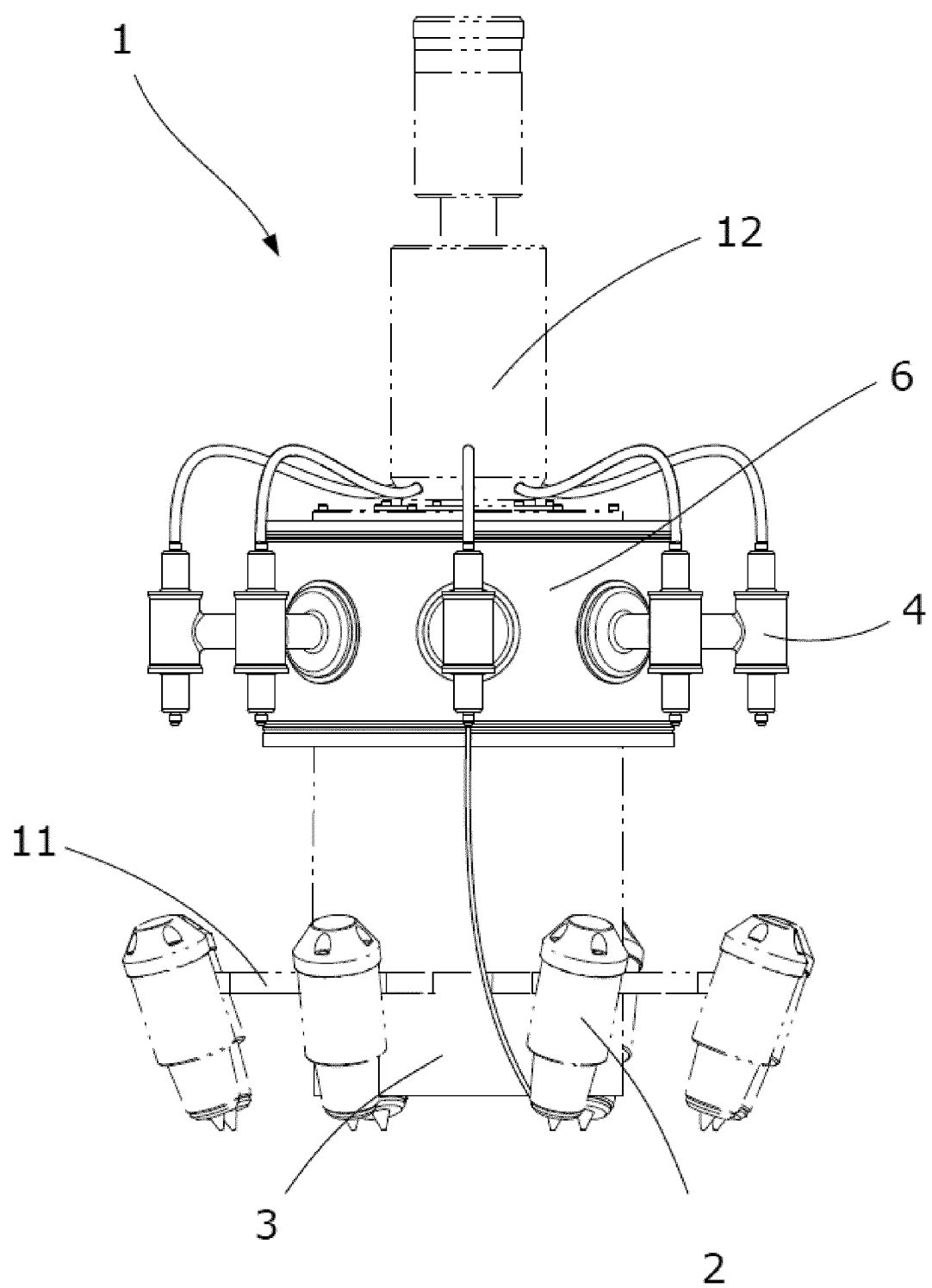
FIG. 2 This figure shows a side view of an embodiment of the flow measuring system.
Figure 3:
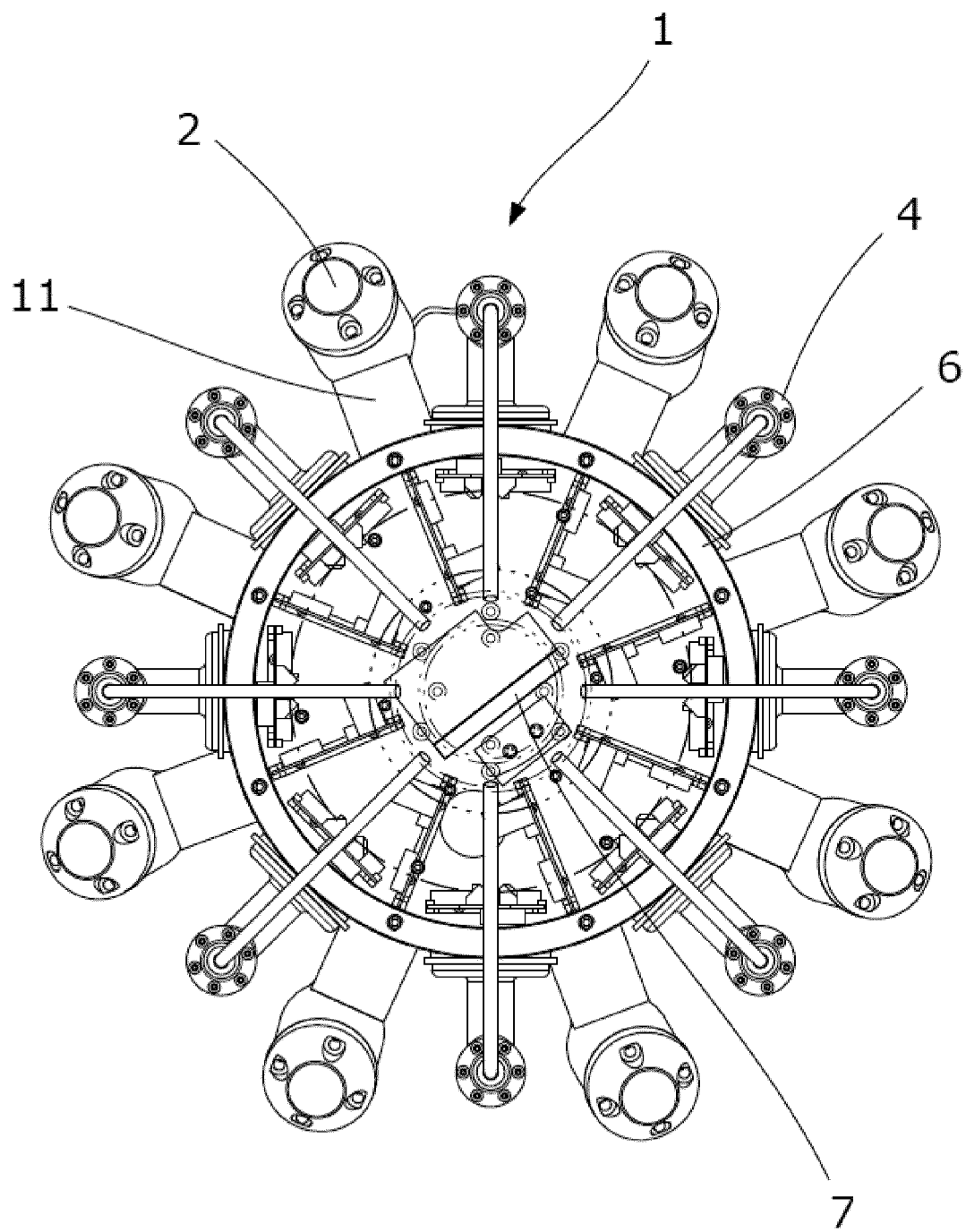
FIG. 3 This figure shows an upper view of an embodiment of the flow measuring system.

The embodiment depicted on FIGS. 1-3 shows eight electromagnetic flowmeters (4) attached to the cylindrical fluid measuring platform (6) with connecting arms. The cylindrical fluid measuring platform (6) rotates in conjunction with the fluid applying platform (3) so that each flowmeters (4) is positioned approximately above the corresponding fluid injector (2) in fluid communication. In the embodiment of FIGS. 1-3, the fluid communication between the flowmeters (4) and the fluid injectors (2) is achieved with a duct. On FIGS. 1-3, it has been depicted only one duct outside of the fluid measuring platform (6) to make it easier to see, although this arrangement is not intended to limit the number or position of the fluid communication means.

The fluid measuring platform (6) is essentially hollow, and is designed to be installed between the fluid feeding pot (12) and the fluid applying platform (3). As FIG. 1 shows, the fluid measuring platform (6) provides the required room for the flowmeters (4) and for signal processing devices (5, 7) capable of processing a flow rate signal, among other functions. In the embodiments shown in the FIGS. 1 to 4a-4c, the sensing elements of the flowmeters (4) are located outside of the fluid measuring platform (6), and the associated elements are located inside of the fluid measuring platform (6). In other embodiments the sensing elements of the flowmeters (4) are placed inside of the fluid measuring platform (6), with the conducts enabling fluid communication placed within the measuring platform (6).

FIG. 3 shows an upper view of the fluid measuring platform (6), superimposed to the fluid applying platform (3). This view allows the observer to view the flowmeters (4) and the injectors (2). Although in FIG. 3 these two elements are depicted with a certain angular offset for ease of the observer, this arrangement is not intended to limit the position of the fluid measuring platform (6) and the fluid applying platform (3).

Signal Processing Devices

The signals related to the flow rate applied by each injector (2) are generated by the respective flowmeters (4), and are subsequently emitted to a receiving device, preferably with a wired or wireless connection.

Figure 4A:
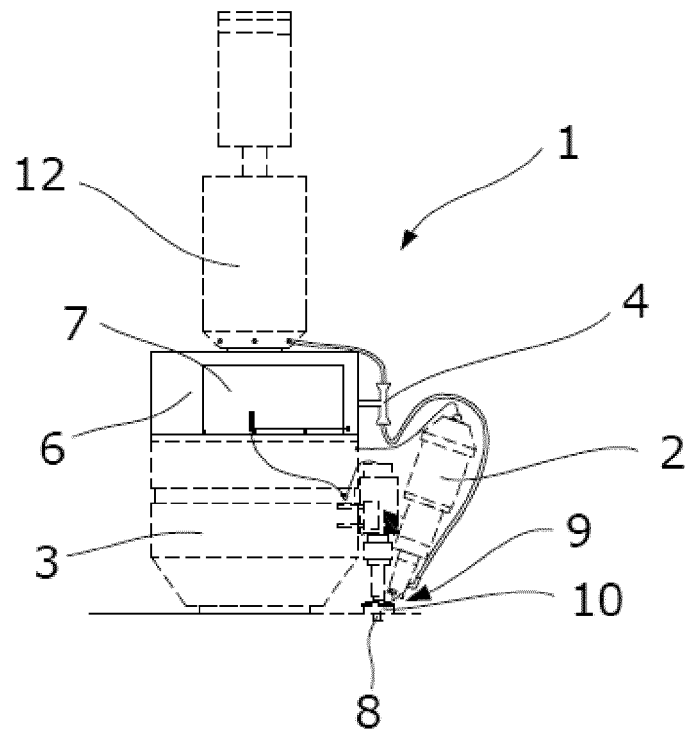
FIGS. 4a-4c These figures show three possible embodiments of the signal processing devices.

According to one embodiment, depicted on FIGS. 1 and 4a, the flow rate signals are received by a first signal processing device (7), for example a PLC or SCADA device, capable of displaying flow rate data to a user, use the flow rate data to perform dry film weight calculations, or make use of the flow rate data or derived data in a control process, among other possible uses. The first signal processing device (7) is placed inside of the fluid measuring platform (6) in this embodiment, thus enabling a compact design of the system (1).

Alternatively, the flow measuring system (1) comprises a second signal processing device (5), which comprises a radiofrequency emitter operatively connected to the first signal processing device (7) and placed inside of the flow measuring platform (6), so that the flow rate signal is emitted to the first signal processing device (7) placed outside of the fluid measuring platform (6); the first signal processing device (7) thus can be placed in a distant position relative to the system (1). This latter option, shown on FIG. 4c, reduces the number of operations performed by the second signal processing device (5) inside of the measuring platform (6), allowing a more compact design with the consequent size reduction, and allowing the integration outside of the measuring platform (6) of the first signal processing device (7) as part of an existing control system of the fluid applying system. It also enables a master-slave layout of the processing devices, which is particularly useful to improve the communication between the signal processing devices (5, 7) and gives a better access for an operator.

Figure 4B:
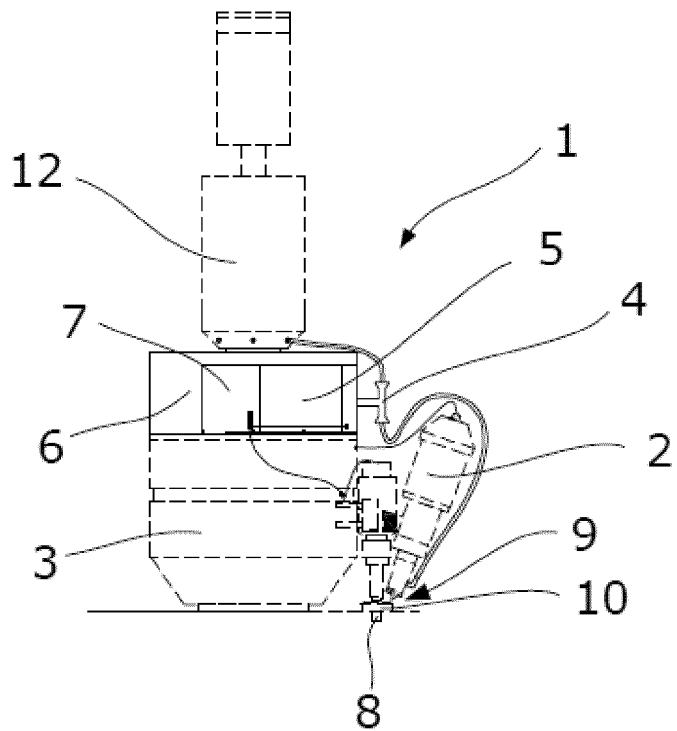
Figure 4C:
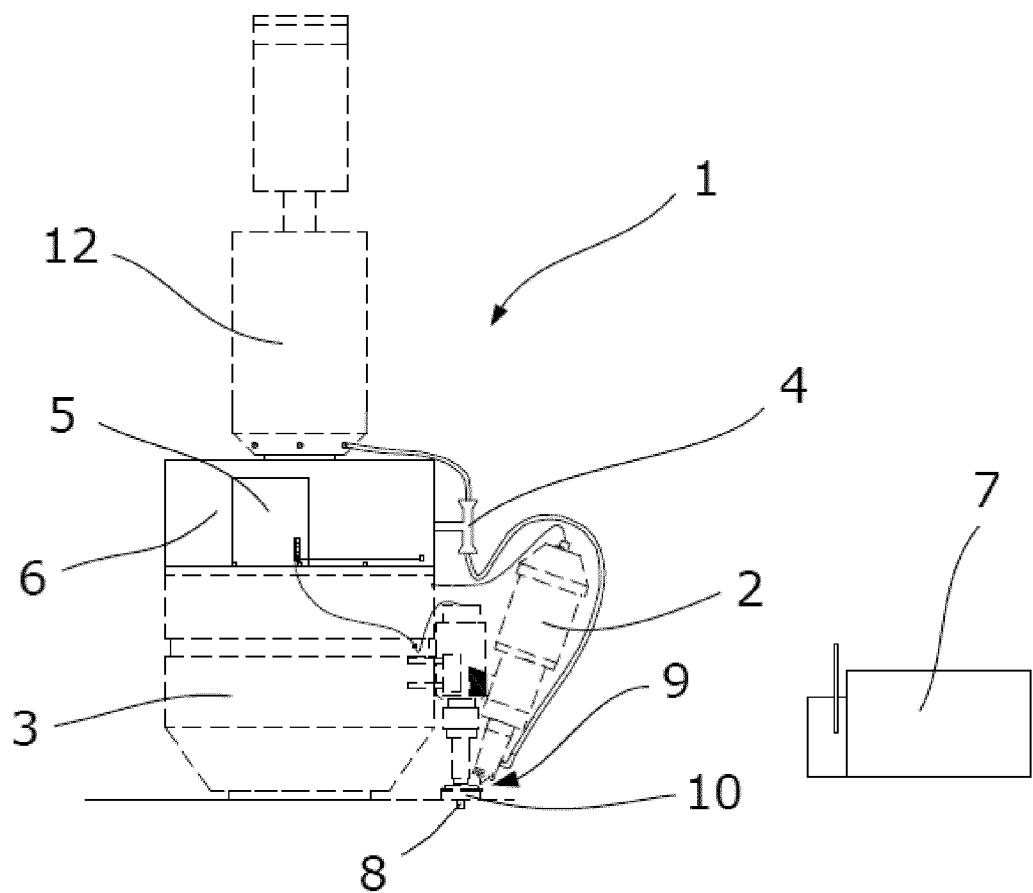

According to another embodiment, depicted on FIG. 4b, the first and second signal processing devices (5, 7) are positioned inside of the fluid measuring platform (6).

Once the flow rate signal has been generated and transmitted, it is processed by one or both the first and second signal processing devices (5, 7), and the resulting signal is either displayed to a user, for example in the screen of a computer, or it is used as an input signal of a control system.

Flow Measuring Method

The flow measuring method begins with the step of providing initial data to the flow measuring system (1), inputting said initial data in the first signal processing device (7) by means of an interface element such as a keyboard or a wireless device. This initial data comprises fluid data (e.g. density, percentage of solid compounds, etc.) and other data (e.g. weight specification, allowable range, etc.). These signals will be used to compute the weight of the applied fluid.

The fluid applying system then initiates the fluid applying process, starting the rotation with the fluid under pressure. Once in motion, a plurality of position sensors (8) configured to detect the presence of the parts (9) emit a signal related to the application of a fluid to a part (9) when a part (9) is in position; said signal is used to count the number of processed parts (9). Then the needles of the injectors (2) are lifted, applying the sealant to the parts (9). The signal that gives the order to the injectors (2) to inject the product can also be used to count the number of processed parts (9). The total amount of processed parts (9) will be used to compute the dry weight of the applied fluid per part (9) and per injector (2).

As the injectors (2) are fed with sealant, the upstream flowmeters (4) measure the flow rate of sealant applied by each injector (2). The flowmeters (4) generate a flow signal rate which is then directly or indirectly transmitted to a first signal processing device (7), which receives and processes the flow rate signal. The flow rate related signal is then used in the computation of the applied sealant weight per part (9) and injector (2), together with the initial data and the amount of processed parts (9).

As a final step, the resulting value of applied sealant weight is either displayed for a user or fed as a variable signal of a control process. Additionally, the dry weight value, together with other values such as process time, number of rejected parts (9) and other statistical values, can be recorded for later consideration. The present invention further enables the capability of displaying light and/or sound signals, or triggering another type of signal if the value of applied sealant weight is out of the allowable range, informing an operator that the system is applying an incorrect amount of fluid, and that appropriate correcting measures should be conducted.

The invention claimed is:

1. A flow measuring system for a fluid applying system that applies a fluid to a plurality of parts, the flow measuring system measuring a flow rate of the fluid applied to each one of the plurality of parts,
   the fluid applying system comprising:
      a plurality of supporting members configured for supporting the plurality of parts,
      a plurality of fluid injectors arranged in a fluid applying platform, the plurality of fluid injectors injecting a fluid,
   wherein the flow measuring system comprises:
      a plurality of flowmeters, each of the flowmeters in fluid communication with one of the fluid injectors, the plurality of flowmeters being configured to generate, process and transmit a signal related to the flow rate of the injected fluid,
      at least a first signal processing device, processing the flow rate signals of the plurality of flowmeters, and
      a fluid measuring platform, separated from the fluid applying platform and holding at least the plurality of flowmeters,
      and wherein the fluid applying system is configured to generate one or more signals related to the application of the fluid to a part of the plurality of parts, and is operatively connected to the first signal processing device.

2. The flow measuring system according to claim 1, wherein,
   the fluid applying system is a rotatory fluid applying system, and
   the fluid measuring platform is configured to rotate in conjunction with the fluid applying platform of the rotatory fluid applying system.

3. The flow measuring system according to claim 1, wherein
   the fluid applying system comprises one or more position sensors in at least one of the supporting member configured for generating a signal related to the application of the fluid to a part of the plurality of parts, and
   the first signal processing device is operatively connected to the one or more position sensors and configured to count the number of processed parts with the signal related to the application of the fluid to the part.

4. The flow measuring system according to claim 1, further comprising at least a second signal processing device processing the flow rate signal of each flowmeter or the signal related to the application of the fluid to a part of the plurality of parts, or both, and operatively connected to the first signal processing device.

5. The flow measuring system according to claim 1, wherein the fluid measuring platform holds the first signal processing device, or the second signal processing device, or both.

6. The flow measuring system according to claim 1, wherein the flowmeters of the plurality of flowmeters are high precision flowmeters.

7. The flow measuring system according to claim 6, wherein the flowmeters of the plurality of flowmeters are electromagnetic flowmeters.

8. The flow measuring system according to claim 1, wherein the plurality of flowmeters is arranged on the outside of the fluid measuring platform.

9. The flow measuring system according to claim 1, wherein the plurality of flowmeters is arranged on the inside of the fluid measuring platform.

10. The flow measuring system according to claim 1, wherein the fluid measuring platform comprises a plurality of openings configured to enable an operative connection between each of the flowmeters and the at least first processing device, or to enable a fluid communication between the plurality of flowmeters and the plurality of fluid injectors, or both.

11. The flow measuring system according to claim 1, wherein the fluid measuring platform comprises a symmetric shape.

12. A method for measuring a flow in a fluid applying system for applying a fluid to a plurality of parts, the fluid applying system comprising a flow measuring system according to claim 1, wherein the method comprises the following steps:
   a. inputting initial data in the first signal processing device,
   b. initiating the fluid injection,
   c. measuring the amount of fluid injected with a flowmeter of the plurality of flowmeters,
   d. transmitting a signal related to the flow rate to the first signal processing device,
   e. generating and emitting a signal related to the application of the fluid to a part of plurality of parts to the first signal processing device,
   f. determining the amount of fluid injected with the signals related to the flow rate and the initial data, and
   g. outputting the result of the computed amount of fluid injected to a displaying means and storing the result.

13. The method for measuring a flow according to claim 12, wherein the method further comprises between steps e. and f. the step of transmitting a signal related to the flow rate or a signal related to the application of the fluid to a part of the plurality of parts or both from a second signal processing device to the first signal processing device.

14. The method for measuring a flow according to claim 12, wherein an amount of fluid injected is expressed in terms of weight of dry fluid per part.

15. A system for controlling the application by a fluid applying system of a fluid to a plurality of parts comprising a flow measuring system according to claim 1.

* * * * *